Aug. 4, 1942.                    B. M. CRAIG                    2,291,883
              CONTROL FOR REGISTERING MECHANISMS AND THE LIKE
                   Filed Aug. 2, 1940            6 Sheets-Sheet 1

Inventor
Burnie M. Craig.

Bachelor & Scantlebury
Attorneys.

Aug. 4, 1942.  B. M. CRAIG  2,291,883
CONTROL FOR REGISTERING MECHANISMS AND THE LIKE
Filed Aug. 2, 1940  6 Sheets-Sheet 5

Inventor
Burnie M. Craig.

Barlow & Scantlebury

Attorneys.

Aug. 4, 1942.  B. M. CRAIG  2,291,883
CONTROL FOR REGISTERING MECHANISMS AND THE LIKE
Filed Aug. 2, 1940  6 Sheets-Sheet 6

Inventor
Burnie M. Craig

Bachelor & Scantlebury
Attorneys.

Patented Aug. 4, 1942

2,291,883

UNITED STATES PATENT OFFICE 2,291,883

CONTROL FOR REGISTERING MECHANISMS AND THE LIKE

Burnie M. Craig, Arcadia, Calif., assignor to Smith Meter Company, Los Angeles, Calif., a corporation of California Application August 2, 1940, Serial No. 349,861

15 Claims. (Cl. 74—112)

This invention relates generally to controls for registering mechanisms or the like, and is more particularly concerned with controls of the clutch type.

The control is adaptable for use in many different situations, but from this point on I will refer to a particular adaptation in order that certain points may be more clearly brought out, but it is distinctly to be understood that this confinement to a particular illustrative use, is in no way to be considered as limitative on the broader aspects of the invention.

I have chosen to illustrate and will describe the control in connection with the drive between the rotor of a fluid metering mechanism and the drive shaft of a register mechanism whereby a measure of the delivery of the meter is indicated. All such drives, to give an accurate reading, must include a means for varying the angular velocity of the register-drive shaft with respect to the angular velocity of the measuring element of the meter. For instance, the measuring element of the meter may be a rotor which delivers a predetermined volume of fluid during each revolution thereof. Then, by rotating the drive shaft of the register mechanism in timed relation with the angular velocity of the rotor and properly calibrating the register mechanism, said register mechanism, as a rotor-revolution counter, will indicate the output of the meter. However, due to fluid slippage past certain meter parts, due to varying frictional engagement between meter parts, due to varying characteristics of the fluids being metered, and due to individual characteristics of each meter, there is necessity for compensating means within the drive connection to insure proper delivery registration at all times.

One means for accomplishing this adjustment has been the provision of change-gears in the drive connection. The changing of such gears to compensate for variations such as those spoken of above, necessarily involves a more or less troublesome and time-consuming task and the fineness and over-all range of adjustment are necessarily confined to the particular change-gears which are available to the operator. And, of course, there is a definite practical limit to the fineness of adjustment possible by substitution of change-gears.

I have provided means for accomplishing this adjustment without the necessity of change-gears, and yet the range and fineness of adjustment are greatly increased over the change-gear provision, and adjustment may be accomplished with the utmost ease and expediency.

The speed-adjustment means is of such a type that it may be combined with an actuating means so associated with the fluid being metered that there is an automatic compensation for volumetric changes in the fluid due to temperature changes. It is well recognized that, for a meter to read accurately, there must be some provision whereby such volumetric changes are compensated. That is, a given volume of fluid is supposed to be delivered to a consumer when that fluid is at a given normal temperature. If that given volume is delivered while it is at a higher temperature, as soon as the fluid returns to given normal temperature it will be of reduced volume, and the consumer will not have received the amount of fluid for which he contracted. Since, under the latter conditions, the meter will be registering the amount of fluid delivered in its expanded state, it will give a false reading so far as the amount of delivery of unexpanded fluid is concerned, while the commitment was for the delivery of the indicated amount of unexpanded fluid. In other words, the register is giving an over-reading so far as it pertains to the delivery of unexpanded fluid.

This over-reading may be prevented by reducing the angular velocity of the registering mechanism drive shaft with relation to the angular velocity of the meter-rotor, and my device is so arranged that this slowing down is proportional to the variations in temperature rise.

I have also provided means whereby there may be adjustment to care for fluids, irrespective of their coefficients of expansion, it being obvious that one fluid having a given coefficient of expansion will cause a different over-reading on the register than will a fluid having another coefficient of expansion. Thus, for unit variation in temperature in both cases, the differential between drive and driven shafts will have to be varied, and the adjustment whereby this variance is accomplished with ease and dispatch, makes up one aspect of my invention.

How the above is accomplished, may be pointed out to better advantage in connection with the following detailed description, reference being had to the accompanying drawings in which.

Figure 1:
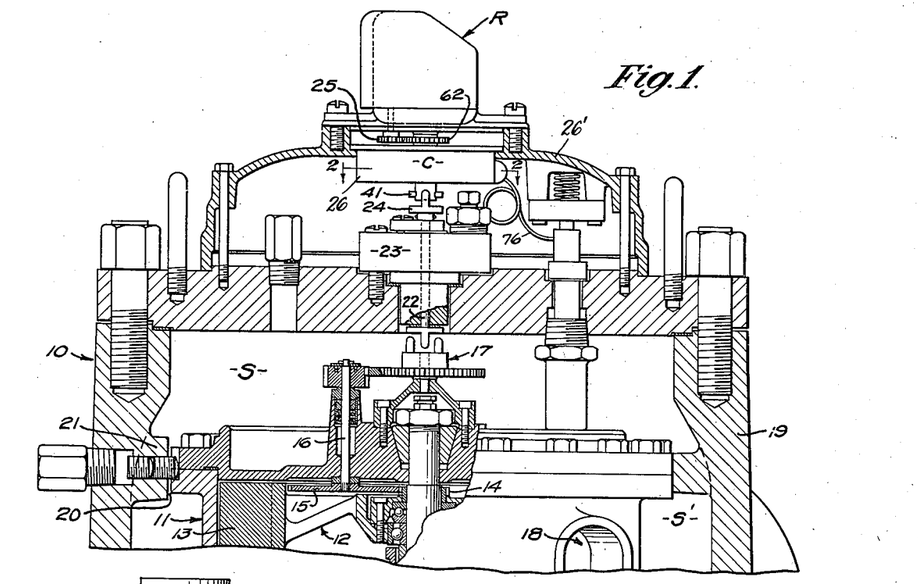
Fig. 1 is a sectional view through a metering device, showing an embodiment of my invention applied thereto.

In Fig. 1 I have illustrated a fragment of a double-walled meter 10, the inner housing 11 containing a rotor 12 and blades 13, the blades shuttling and the rotor revolving by reason of the impingement of fluid against those blades and the coaction of the blades with a cam, not shown. Through pinion 14 and gear 15 a spindle 16, extending from within the inner wall to the space S between walls, is rotated to drive clutch 17, and it will be assumed for the purposes of this description that the clutch 17 is rotated, during metering operations, in a direction normally to drive the shafts above the clutch in a counter-clockwise direction, as viewed in all the plan views.

It will be assumed that space S is filled with the fluid, being metered, the inlet to the flow passage of the inner casing being by way of space S' (though this inlet is not shown) while the outlet 18 of the flow passage within casing 11 communicates directly with the outlet of the outer housing 19 (though this inter-communication is not shown). It will be seen that spaces S and S' may be in communication through space 20 or around lugs 21. Thus, the element which is later described as immersed in the fluid in chamber S is, in effect, responsive to temperature changes occurring in the fluid which is actually being measured.

Clutch 17 drives the shaft 22 which extends through the packing member generally indicated at 23 and carries at its upper end a clutch member 24. A registering mechanism R is adapted to be driven from gear 25, the change-speed mechanism generally indicated at C, transmitting the drive from clutch 24 to gear 25. The entire drive connection between the rotor 12 and register R is of such a nature as to operate the register in timed relation to rotor-rotation, the register being calibrated so it indicates the volumetric output of the meter.

The change-speed mechanism C is of a nature to compensate for inaccuracies and for temperature changes in the fluid being metered, as discussed in the introduction to this specification.

Referring now particularly to Figs. 3 to 6, inclusive, it will be seen that mechanism C includes a cylindrical casing 26 comprising a circular base 27 with an annular flange 28 and a detachable cap 29. A shifter member in the form of lever 30 rests on the base 27, being mounted for movement pivotally about base-stud 31 which is at one side of hollow hub 32. The lever extends at the other side of the hub to form arm 33. Arm 34 of the lever is relatively short, while arm 35 is extended and its distal end 36 is taken in annular groove 37 of plunger 38.

Figure 2:
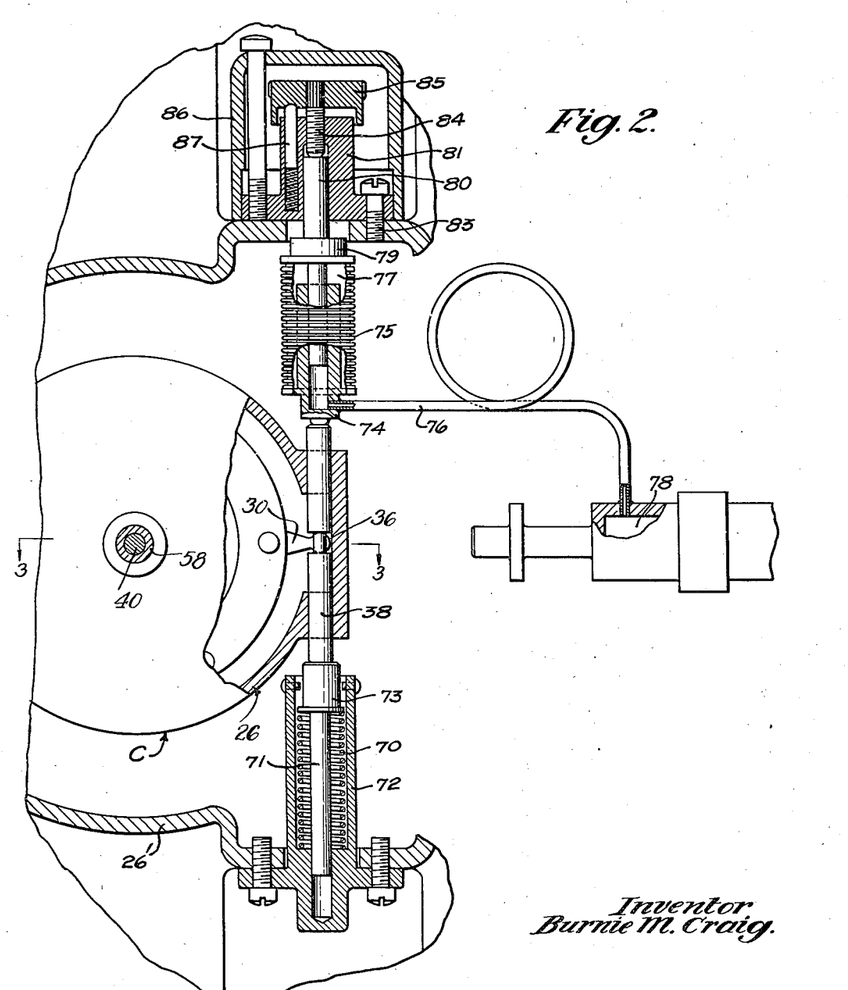
Fig. 2 is an enlarged fragmentary section on line 2—2 of Fig. 1.

In the embodiment of the invention shown in Figs. 1 and 2, this plunger 38 is adapted to be reciprocated by temperature-responsive means. However, it will simplify the description of mechanism C if, for the time being, it be assumed that the plunger 38 be reciprocated manually and, of course, such manual reciprocation is feasible where it is desired to adjust mechanism C to compensate for inaccuracies which arise from reasons other than change in fluid-temperature. Therefore, we will refer to the manual adjustment shown in Fig. 4 during the immediately succeeding description.

Figures 4, 5, 6:
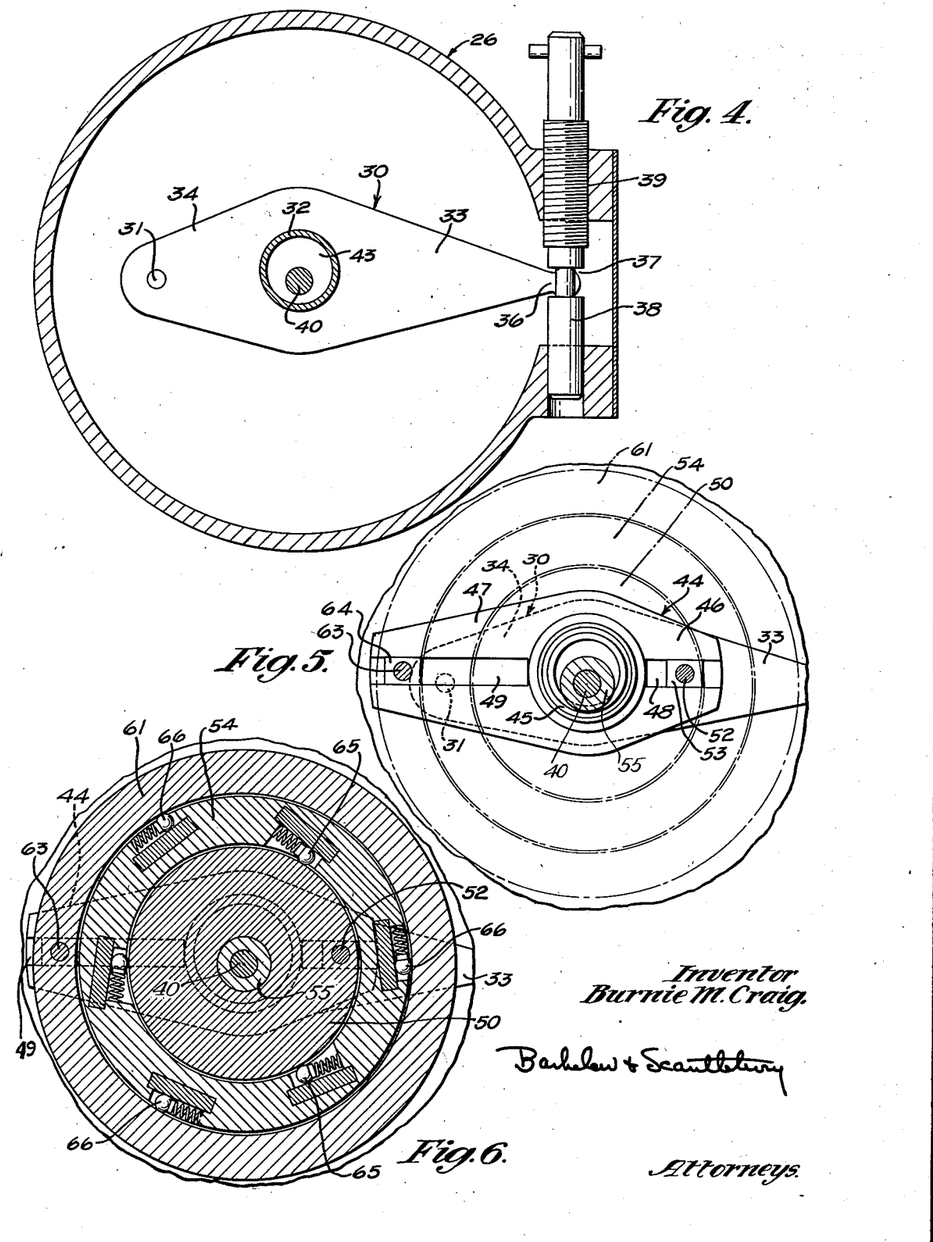
Fig. 4 is a reduced section on line 4—4 of Fig. 3, with the view rotated to the aspect of Fig. 2 but showing a variational type of adjustment means.
Fig. 5 is a reduced section on line 5—5 of Fig. 3, the view being rotated to the aspect of Fig. 2.
Fig. 6 is a reduced section on line 6—6 of Fig. 3, the view being rotated to the aspect of Fig. 2.

It will be seen that by threadably interconnecting plunger 38 and housing 26 at 39, manual rotation of the plunger will threadably move it in an axial direction, and thus swing lever 33 about pivot 31. The spindle shaft 40, which carries the clutch members 41 for coaction with clutch member 24, has bearing in bore 42 of housing wall 27, and this spindle is taken, with horizontally measured clearance, within bore 43 of hub 32. It will be seen that the pivot point 31 is so arranged that the lever may be swung either into a position where hub 32 is concentric with spindle 40, or to positions of varying eccentricity with relation to that spindle.

Slide 44 has rotational bearing at 45 on hub 32, while the under, annular face 45' of the slide hub has rotational and end thrust bearing on the upper face of shifter 30. The vertical axis of hub 32 thus becomes the axis of rotation for slide 44.

Figure 3:
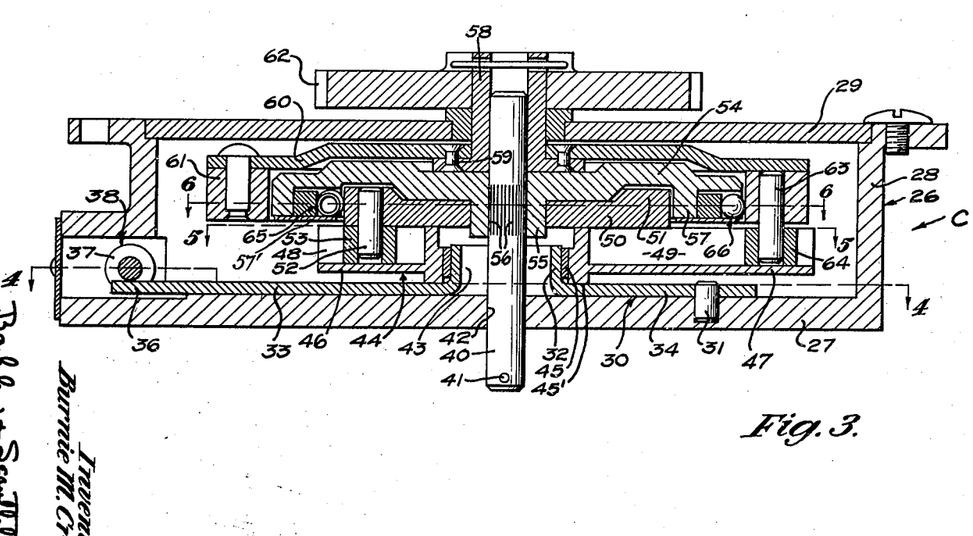
Fig. 3 is an enlarged section on line 3—3 of Fig. 2.

Slide 44 has the diametrically opposed arms 46 and 47, arm 46 being shorter than arm 47 (the long arm extends to the left in Fig. 5 and to the right in Fig. 3, but it will be remembered in the description of Fig. 5, it was stated that this view was rotated into the aspect of Fig. 2). In the two arms are provided coaxial, diametrically extending, ways 48 and 49.

Having rotational and down-thrust bearing on the top of slide 44, is an inner clutch ring 50 having a thickened rim 51. This ring carries a fixed pin 52 which has rotational bearing in slide block 53, the latter being adapted to play endwise of way 48.

Having rotational bearing on top of member 50 is an intermediate clutch ring 54, the hub 55 of which has rotational bearing within the bore of inner ring 50. Ring 54 is held at 56 against rotation with respect to spindle 40, so spindle drive causes rotation of member 54. The rim 57 of ring 54 is offset vertically so that it lies in coplanar relation to inner ring 50, as clearly shown in Fig. 3.

Mounted for relative rotation on ring 54 and about spindle 40, is the hub 58 secured at 59 to disk 60 which supports the depending, outer clutch ring 61, the latter coplanar with rims 51 and 57. Exteriorly of cover 29, is gear 62 which may be considered the driven gear of mechanism C, but becomes the driving gear for register gear 25, while hub 58 may be considered the driven shaft of mechanism C.

Outer clutch ring 61 carries depending pin 63 which extends into rotational bearing with slide block 64, the latter being adapted to play endwise through guideway 49.

Rings 50, 54 and 61, are thus mounted for relative rotation about a common axis, and the rings are spaced apart to give slight annular clearance as clearly shown in Fig. 6. However, over-running clutches generally indicated at 65 are provided between rings 50 and 54, while over-running clutches generally indicated at 66 are provided between clutch rings 54 and 61. These clutches are all of a nature to permit clockwise rotation (Fig. 6) of ring 54 with respect to ring 50 or ring 61, but prevent relative movement in a reverse direction. The over-running clutches may be of any suitable form, though we have here shown them as of the spring-pressed ball type, since this arrangement has the capacity of giving infinitely fine adjustment. The clutch assemblies are held in position by retainer washer 57' which may be secured to the underside of rim 57 in any suitable manner.

In describing the operation of the device, reference will be had particularly to the diagrams of Figs. 9 through 14, inclusive. In order to simplify the showing, we have substituted positive pawl-ratcheting means for the ball clutches of the main figures, but it will be understood the principle remains the same. Also, we have indicated pins 52 and 63 as pivotally supporting the pawls but this is merely as a matter of convenience to simplify the showing. In considering these diagrammatic views, it is to be remembered that, in all effects, spindle 40 and intermediate clutch ring 54 are integral and move as one.

Figure 10:
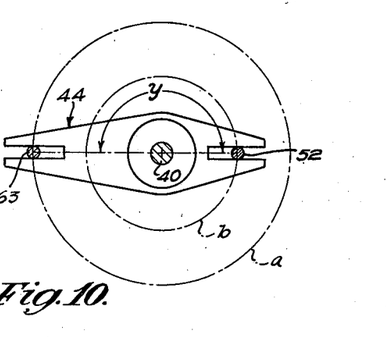

Considering the parts in the relative positions of Fig. 10, with lever 30 shifted to bring the center of slide member 44 into co-axial relation with spindle 40, it will be seen that counter-clockwise rotation of the spindle will drive the clutch ring 54 in a counter-clockwise direction, thus driving, through inner clutch 65 and outer clutch 66, the inner and outer rings 50 and 61, respectively; ring 61 driving hub or shaft 58 and gear 62 in a counter-clockwise direction and in a one-to-one ratio with respect to spindle 40. The orbits a and b of pins 63 and 52, respectively, will, of course, be concentric with the spindle, and since the axis of rotation of slide 44 is at this time also concentric with the orbit-center 40, the pins will merely bodily rotate the slide member about that axis and there will be no relative movement between the pins and the slide member. At this time, the spindle 40 and pins 52—63 have a common line of centers or are in a common axial plane.

Figure 11:
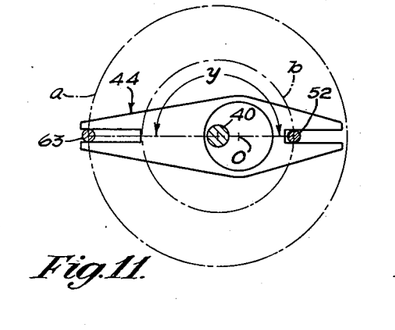

Now assume slide member 44 be shifted radially to the position of Fig. 11, which brings its center of rotation 0 into eccentric relation with spindle 40 and therefore with relation to the center of orbits a and b. The spindle 40 and pins 63 and 52 will still lie in a common axial plane, and the angle y will, of course, be 180°.

Figure 12:
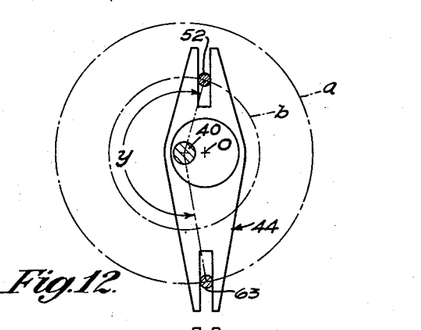

If we now consider angular movement of the slide member, without considering the drive connection which sets up this movement, it will be seen that due to the radial displacement of the center of rotation of the slide with respect to the orbital center, in moving the slide from the position of Fig. 11 to that of Fig. 12 (counterclockwise) there will be angular displacement between the spindle center and the pin centers, the sliding movement of blocks 53 and 64 in ways 48 and 49, respectively, accommodating the relative movement necessary to this condition.

Thus, when the slide member is rotated through 90° from the position of Fig. 11 to that of Fig. 12, it will be seen that angle y becomes greater than 90°, meaning that pins 63 and 52 have been relatively angularly displaced in a counter-clockwise direction, the pawls preventing relative clockwise movement between the rings and thus forcing the relative displacement to be represented as a counter-clockwise angular advance of pin 63 and ring 61 with respect to pin 52 and ring 50. The clutch arrangement is such that the extent of angular movement of the drive shaft can at no time be greater than that of either ring 50 or 63, so, while ring 61 and pin 63 have moved through more than 90°, the fact that pin 52 and ring 50 have moved through less than 90° establishes the fact that the drive shaft has moved through less than 90° in swinging lever 44 from the position of Fig. 11 to the position of Fig. 12.

Considering the driving aspect, during this particular part of the cycle, clutch 65 imparts the drive from spindle 40 and member 54 to member 50 and pin 52 at drive-spindle speed, though through less than 90°. Pin 52, in turn, has swung lever 44 through 90°, and the lever has acted as a driver to move pin 63, ring 61 and driven shaft 58 through more than 90°. Thus, during this portion of the cycle, the driven shaft has greater angular velocity than the drive shaft. Clutch 66 "ratchets" ahead during this period.

Figure 13:
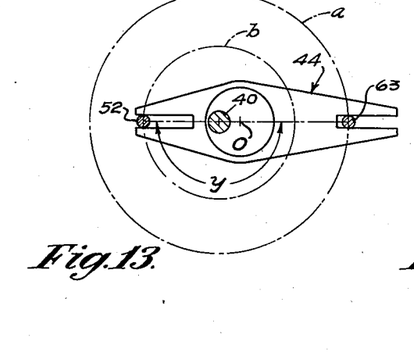

Again considering the spindle as being un-driven from the power source, it will be seen that when the slide member moves from the position of Fig. 12 to that of Fig. 13, pins 63 and 52 and spindle 40 are brought back to alinement in a single axial plane, and angle y again becomes 180°, so, during this movement, the angle between pins 63 and 52 is decreasing, this resulting in a counter-clockwise advance of pin 52 toward pin 63. Pin 52 has moved through more than 90° while pin 63 has moved less than 90° and, because the drive shaft can at no time travel further than either pin, spindle 40 must have rotated less than 90°.

Considering the driving aspect during the Fig. 12 to Fig. 13 portion of the cycle, the drive can no longer be through pin 52 and lever 44 since pin 52 must now travel more than 90° and hence must go faster than the drive shaft is capable of driving it. Therefore the drive from member 54 to ring 61 and thence to driven shaft 58 is through clutch 66 at a one-to-one ratio, and the relative advance of pin 52 with respect to pin 63 (in other words, the increased angular velocity of ring 50 over ring 61) is absorbed by ring 50 "ratcheting" ahead at clutch 65.

Figure 14:
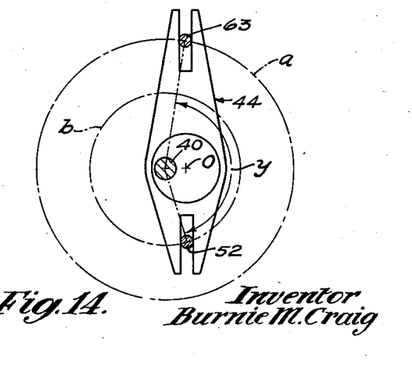

In moving the slide member 44 from the position of Fig. 13 to that of Fig. 14 the pins 63 and 52 are again angularly relatively displaced to further decrease the angle y, the displacement again being represented by pin 52 tending to "catch up" with pin 63. The same general conditions will prevail as have been described in connection with the immediately preceding portion of the cycle, that is, spindle 40, pin 63, ring 61 and shaft 58 will each have rotated less than 90°, pin 52 and ring 50 will have rotated more than 90°; the drive will be from member 54 through clutch 66 to ring 61 in a one-to-one ratio; and the over-advance of pin 52 and ring 50 will have been absorbed by the "ratcheting ahead" of clutch 65.

In moving from the position of Fig. 14 to Fig. 11, the pins 63 and 52 are again relatively angularly displaced, the displacement being represented as a counter-clockwise advance of pin 63 with respect to pin 52, and a consequently increasing angle y. The system then responds generally in the manner described in connection with the Fig. 11 to Fig. 12 portion of the cycle, that is, spindle 40, member 54, pin 52 and ring 50 rotate less than 90°; and pin 52, driven at a one-to-one ratio by member 54 through clutch 65, swings lever 44 in a manner to move pin 63 through more than 90°, the ring 61 and driven shaft 58 thus being rotated at greater than drive shaft speed.

Generally, it may be stated that the drive from driving shaft 40 to ring 61 (which latter alternately receives its drive from clutch 65 and lever 44) is in a one-to-one ratio during periods when angle $y$ is decreasing (Fig. 12 to Fig. 13 and Fig. 13 to Fig. 14) and is in a one-to-one plus ratio when angle $y$ is increasing (Fig. 11 to Fig. 12 and Fig. 14 to Fig. 11). It will be seen that in passing from the position of Fig. 11 through the positions of Figs. 12, 13 and 14 and back to Fig. 11, the lever 44 and pins 52, 63 have each rotated through 360° but that drive shaft 40 has not had that extent of rotation. So, if with less than 360° rotation of the drive shaft a full 360° rotation has been given to ring 61 and hence to driven shaft 58, it obviously follows that for a full 360° rotation of the drive shaft, there will be an angular displacement of greater than 360° imparted to the driven shaft. That is, for each 360° angular movement of spindle 40 there is an angular movement of shaft 58 of 360° plus a definite increment of advance, so the ratio of the angular velocities of shafts 40 and 58, instead of being one-to-one, as in Fig. 10, is now a one-to-one-plus ratio, speeding up the register drive with relation to the meter drive.

It will be seen that by increasing the degree of eccentricity between slide member 44 and the axis of spindle 40, the angular velocity of shaft 58 may be further increased over that of the spindle, or by reducing the eccentricity, the speed differential may be decreased. Thus, assuming the slide member 44 is normally set at a degree of eccentricity which will give a speed ratio proper to a given situation, if it be decided to decrease that differential and thus relatively slow down shaft 58, the slide 44 need merely be adjusted, by actuation of lever 33, to a position where the specified eccentricity is decreased.

Figure 3A:
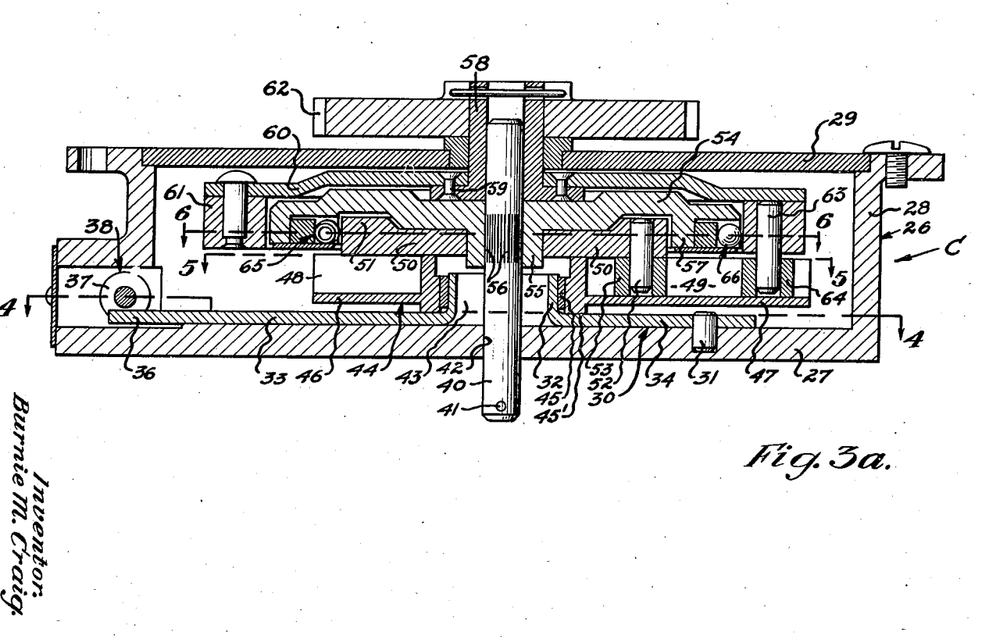
Fig. 3a is a view generally similar to Fig. 3 but showing a variational arrangement of the slide blocks.

It will be seen that by placing both slide blocks 53 and 64 in the single way 49 and re-entering the pins in the blocks, as in Fig. 3a, the increment of advance may be decreased though the degree of eccentricity between spindle 40 and center 0 remains the same.

Now referring to the embodiment shown in Figs. 1 and 2 where plunger 38 is adapted to respond by axial movement due to temperature changes of the fluid within chamber S, it will be noted that plunger 38 is unthreaded and is therefore capable of moving directly axially without rotation. Imposed against one end of plunger 38 is the force of spring 70 tending always to shift the plunger in a direction to rotate lever 30 in a counter-clockwise direction, as viewed in Fig. 4. Spring 70 acts directly against a plunger 71 mounted for reciprocation in housing 72 attached to casing 26', the plunger 71 having a head 73 which is in alinement with plunger 38 and in engagement with the end thereof.

The other end of plunger 38 engages or carries a hollow head 74 which comprises one end of the "Sylphon" bellows 75, a flexible metal tube 76 communicating at one end with the chamber 77 defined by the "Sylphon," and the other end communicating with the interior of bulb 78 which is filled with actuating fluid having a suitable coefficient of expansion, the bulb being disposed within chamber S so that temperature changes of fluid within that chamber cause similar changes of the actuating fluid.

The other head 79 of the "Sylphon" has a stem 80 slidably mounted in guide 81 which is bolted at 83 to casing 26'. An adjusting screw 84 carries a graduated adjusting head 85 and extends into contact with the end of stem 80. By removing cap 86 to render head 85 accessible, stem 84 may be adjusted axially to thrust plunger 38, through bodily movement of the "Sylphon" against the pressure of spring 70, or backed off to allow spring 70 to move the plunger in the opposite direction. A detent 87 is adapted to hold head 85 in adjusted position. It will be seen that nut 85 thus serves as a manual adjustment to position lever 30 in a proper "starting" position to give the degree of eccentricity to the slide member which is in consonance with the particular characteristics of the fluid being metered.

On the other hand, as the temperature of the fluid in chamber S rises, the actuating fluid will expand and, acting through "Sylphon" 75, expand the "Sylphon" longitudinally. The head 79 being anchored, this results in head 74 acting against plunger 38 in a manner to compress spring 70, and, as has been described, the resultant movement of lever 30 diminishes the degree of eccentricity between slide member 54 and spindle 40, thus reducing the angular velocity of shaft 58 with relation to the angular velocity of spindle 40.

In connection with the above discussion it will be seen that a unit rise in temperature of the fluid being metered expands that fluid by unit amount, and thus tends to give a false "plus" reading on the register mechanism so far as indicating the amount of unexpanded fluid is concerned. Thus, with temperature rises, it will be apparent that shaft 58 must be slowed down with respect to spindle 40, and it has been explained above that this is precisely the reponse which the mechanism gives—for the necessarily accompanying expansion of the actuating fluid thrusts the shifter in a direction which results in a relative slowing down of the shaft 58.

In originally setting the mechanism, shifter lever 30 will ordinarily be set approximately in the position of Fig. 4, meaning that the slide member is eccentric with relation to spindle 40 and therefore shaft 58 is rotating at a greater than one-to-one ratio with respect to shaft 40. This will be the setting which will give a proper reading on the meter when the fluid being metered is at "normal" temperature or, relatively, unexpanded. Lever 30 thus has a considerable range of movement in a direction which will either increase or decrease the differential between the angular velocities of the spindle 40 and shaft 58.

Now it will be apparent that if a fluid having a higher coefficient of expansion be substituted for the fluid to which the mechanism is set, at normal temperatures the original speed-ratio between the two shafts would still exist. But the same degree of temperature rise now causes greater volumetric expansion of the fluid being metered, and the driven shaft 58 would have to be slowed down with respect to the rotor to a greater extent than before. This means that for each degree of temperature change, the degree of eccentricity between slide member 44 and spindle 40 must be lessened to cause a further slowing down of shaft 58.

This adjustment may be accomplished by changing the relative positions of pivot 31 and the distal end 36 of lever 30, a movement of pivot 31 radially outward changing the mechanism so, for a given angular movement of end 36, the lever 30 will move slide 44 through a greater angle and thus cause a decrease in the angular velocity of shaft 58, it being remembered that the actuating fluid will always give the same plunger movement for each degree rise in its temperature.

Figure 7:
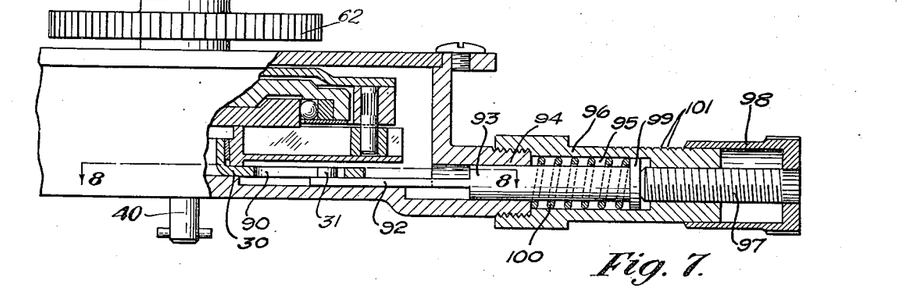
Fig. 7 is a fragmentary section showing a variational form of shifter mounting.
Figure 8:
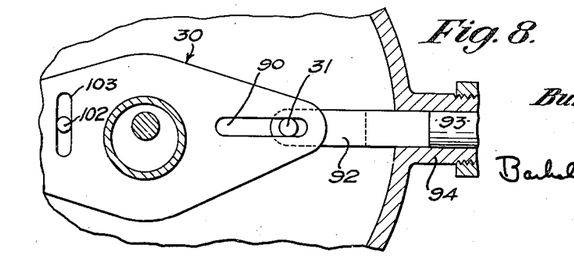
Fig. 8 is a fragmentary section on line 8—8 of Fig. 7.
Figure 9:
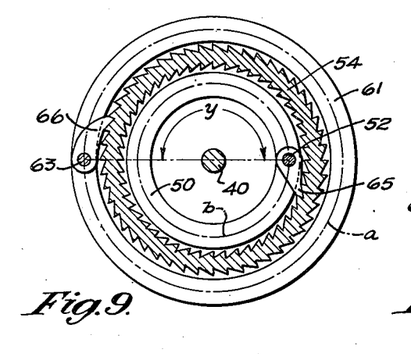
Figs. 9 through 14 are diagrammatic views illustrating certain phases of operation of the control mechanism.

To accomplish this adjustment there may be provided the arrangement shown in Figs. 7 and 8. In this instance, there is provided an axial slot 90 in lever 30 to take pivot 31, while pivot 31 is mounted on blade 92 of plunger 93, this plunger being mounted for sliding movement through boss 94 and the bore 95 of fitting 96. A micrometer screw 97, actuated by nut 98 is adapted to be adjustably threaded against the head 99 of plunger 93, spring 100 constantly having a tendency to shift the plunger to the right in Fig. 7 and thus constantly tending to carry pivot 31 to its radially outermost position. On the other hand, by threading screw 97 through fitting 96, the pivot point 31 is moved radially inward, there preferably being graduations 101 on fitting 96 which will give an indication of the micrometer movement of screw 97.

It will thus be apparent that pivot point 31 may be adjusted radially to bring about the changed operative conditions spoken of just above.

Pin 102 extends from wall 27 through slot 103 in lever 30 to prevent motion of the lever along its longitudinal axis.

While there is shown and described preferred embodiments of the invention, various changes in design, structure and arrangement may be made without departing from the spirit and scope of the appended claims.

I claim:

1. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, angularly displaced, radially extending ways in said slide member, a pair of elements slidable, one each, in said ways, one of the elements being connected to said second member, and the other element being connected to said third member.

2. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, angularly displaced, radially extending ways in said slide member, a pair of elements slidable, one each, in said ways, one of the elements being connected to said second member and the other element being connected to said third member, the radially measured distance between the common axis and said one element being greater than between the common axis and said other element.

3. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, axially alined and radially extending ways in said slide member at opposite sides of its axis of rotation, a pair of elements slidable, one each, in said ways, one of the elements being connected to said second member and the other element being connected to said third member.

4. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, axially alined and radially extending ways in said slide member at opposite sides of its axis of rotation, a pair of elements slidable, one each, in said ways, one of the elements being connected to said second member and the other element being connected to said third element, the radially measured distance between the common axis and said one element being greater than between the common axis and said other element.

5. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, means for shifting said slide member to vary the degree of such eccentricity, angularly displaced, radially extending ways in said slide member, a pair of elements slidable, one each, in said ways, one of the elements being connected to said second member and the other element being connected to said third member.

6. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, means for shifting said slide member to vary the degree of such eccentricity, angularly displaced, radially extending ways in said slide member, a pair of elements slidable, one each, in said ways, one of the elements being connected to said second member and the other element being connected to said third member; said shifting means embodying a lever supported by the supporting means and on which the slide member is mounted for rotation, said lever being mounted for pivotal movement about an axis parallel to but spaced from the axis of rotation of the slide member.

7. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, means for shifting said slide member to vary the degree of such eccentricity, angularly displaced, radially extending ways in said slide member, a pair of elements slidable, one each, in said ways, one of the elements being connected to said second member and the other element being connected to said third member; said shifting means embodying a lever supported by the supporting means and on which the slide member is mounted for rotation, said lever being mounted for pivotal movement about an axis parallel to but spaced from the axis of rotation of the slide member, and means for shifting the point of pivotal support of the lever.

8. In a device of the character described, supporting means, a first shaft mounted for rotation with respect to the suporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, means for shifting said slide member to vary the degree of such eccentricity, angularly displaced, radially extending ways in said slide member, a pair of elements slidable, one each, in said ways, one of the elements being connected to said second member and the other element being connected to said third member; said shifting means embodying a lever supported by the supporting means and on which the slide member is mounted for rotation, said lever being mounted for pivotal movement about an axis parallel to but spaced from the axis of rotation of the slide member, and means for shifting the point of pivotal support of the lever in the direction of the lever axis as defined by the line of centers common to the pivot point and the axis of rotation of the slide member on the lever.

9. In a device of the character described, supporting means, a first shaft mounted for rotation with respect to the supporting means, a second shaft, said shafts being fixed in coaxial relation, a first ring member driven by the first shaft, a second ring member encircling the first ring member and drivingly connected to the second shaft, a third ring member within the first ring member and rotatable with respect to the other ring members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, angularly displaced, radially extending ways in said slide member, a pair of elements slidable, one each, in said ways, one of the elements being connected to said second member and the other element being connected to said third member.

10. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, a pair of elements slidable axially of the slide member and adapted to be driven by slide member rotation, one of said elements being connected to said second member and the other element being connected to said third member.

11. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, a pair of elements slidable axially of the slide member and adapted to be driven by slide member rotation, one of said elements being connected to said second member and the other element being connected to said third member, and means for shifting the slide member to vary the degree of such eccentricity.

12. In a device of the character described, supporting means, a first shaft mounted for rotation with respect to the supporting means, a second shaft, said shafts being fixed in coaxial relation, a first member driven by the first shaft, a second member drivingly connected to the second shaft, a third member rotatable with respect to the other two members, said three members being rotatable about a fixed common axis, a pair of overrunning clutches, one clutch being operative between the first and second members, and the other clutch being operative between the first and third members, said clutches being adapted to overrun in the same direction, a slide member mounted for 360° rotation about an axis parallel to but eccentric with relation to said common axis, a pair of elements slidable axially of the slide member and adapted to be driven by slide member rotation, one of said elements being connected to said second member and the other element being connected to said third member, and means for shifting the slide member to vary the degree of such eccentricity; said shifting means embodying a lever supported by the supporting means and on which the slide member is mounted for rotation, said lever being mounted for pivotal movement about an axis parallel to but spaced from the axis of rotation of the slide member, and means for shifting the point of pivotal support of the lever.

13. In a device of the character described, supporting means, a first shaft mounted for rotation with respect to the supporting means, a second shaft, a first member driven by the first shaft, a second member directly connected to the second shaft, a third member rotatable with respect to the other two members, a pair of overrunning clutches, one clutch being operative between the first and second members; and the other clutch being operative between the first and third members, said clutches being adapted to overrun in the same direction, a lever mounted for rotation about an axis parallel to but eccentrically arranged with respect to the axis of one of the shafts, a direct drive connection between said lever and said second member, and a direct drive connection between said lever and said third member, all in a manner whereby the drive from one shaft to the other is, at one period of operation, directly from the first member to the second member through said one clutch, and, at another period, is from the first member to the second member through the other clutch and the lever.

14. In a device of the character described, supporting means, a first shaft mounted for rotation with respect to the supporting means, a second shaft, a first member driven by the first shaft, a second member directly connected to the second shaft, a third member rotatable with respect to the other two members, a pair of overrunning clutches, one clutch being operative between the first and second members; and the other clutch being operative between the first and third members, said clutches being adapted to overrun in the same direction, a lever mounted for rotation about an axis parallel to but eccentrically arranged with respect to the axis of one of the shafts, a direct drive connection between said lever and said second member, and a direct drive connection between said lever and said third member, the points of drive connections between the lever and the first and third members being spaced radially unequally from the axis of rotation of the lever, all in a manner whereby the drive from one shaft to the other is, at one period of operation, directly from the first member to the second member through said one clutch, and, at another period, is from the first member to the second member through the other clutch and the lever.

15. In a device of the character described, supporting means, a first shaft mounted for rotation with respect to the supporting means, a second shaft, a first member driven by the first shaft, a second member directly connected to the second shaft, a third member rotatable with respect to the other two members, a pair of overrunning clutches, one clutch being operative between the first and second members; and the other clutch being operative between the first and third members, said clutches being adapted to overrun in the same direction, a lever mounted for rotation about an axis parallel to but eccentrically arranged with respect to the axis of one of the shafts, a direct drive connection between said lever and said second member, and a direct drive connection between said lever and said third member, the points of drive connections between the lever and the first and third members being located at opposite sides of and being spaced radially unequally from the axis of rotation of the lever, all in a manner whereby the drive from one shaft to the other is, at one period of operation, directly from the first member to the second member through said one clutch, and, at another period, is from the first member to the second member through the other clutch and the lever.

BURNIE M. CRAIG.